UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

PRESERVING WOOD.

1,076,322.      Specification of Letters Patent.      Patented Oct. 21, 1913.

No Drawing.      Application filed October 14, 1911. Serial No. 654,699.

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Preserving Wood, of which the following is a specification.

We have found that the poisonous organic metal compounds containing mercury, arsenic or antimony form valuable compounds for preserving wood, and that the wood preserved by these compounds has many novel and valuable properties. The compounds which are used according to the present invention are, *e. g.*, the anhydrids of oxymercuric-acetic acid and oxy-mercuric benzoic acid, oxyphenylene-mercuric-oxid, oxy-ortho-nitro-phenylene-mercuric oxid, mercurized ortho-acetylaminophenol, mercurized toluidins, soluble in aqueous dilute ammonia, oxyphenylarsenic acid, dioxy-arseno-benzene, para-aminophenyl-arsenic acid, phenyl-stilbinic acid, etc. These compounds contain the metals in a complex state; they are odorless, non-volatile, non-inflammable and insoluble. Consequently after having been used to impregnate the wood, and having been converted into an insoluble form, they will not be washed out by the moisture in the soil, nor by the rain, their insoluble nature thus serving to conserve and protect the wood from decay. The treated wood is also fireproofed as well as waterproofed by these compounds. Moreover, since the metals are used in the form of organic compounds, which are not ionizable appreciably, they remain practically unchanged in the wood and retain their poisonous, as well as their other, properties, and are not changed and rendered inactive by the ingredients of the wood, nor do these compounds themselves precipitate albumen, or injuriously affect the wood constituents after the treatment is accomplished. These compounds, for purposes of impregnation, are dissolved in an alkaline solvent, and the resulting solution used for coating or soaking or otherwise impregnating the wood, or other objects, to be preserved. A solution containing from 0.01 to 1 per cent. of the metal compound is generally sufficient. After the impregnation with a solution of the poisonous metal compound has been effected the alkali salts of the organic metal compounds are decomposed either by acids, or by suitable metal salts, which react to form insoluble compounds with the organic metal compounds. The carbonic acid of the air will accomplish this conversion of the soluble alkali salts into the insoluble compounds. This conversion is accelerated, however, by the direct application of dilute acids. Similarly solutions of metal salts, *e. g.* cupric sulfate, lead acetate, zinc chlorid, barium chlorid, etc., which react with the alkali salts used to impregnate the wood, can be used, these salt solutions reacting to give insoluble metal salts of the organic metal compounds. These insoluble metal salts in some cases possess an even more effective action of the poison. Thus for example, if chlorid of zinc is allowed to react upon oxymercuric benzoate of sodium the following reaction takes place with the formation of a zinc salt which is almost completely insoluble in water and which possesses the combined poisonous effect of mercury and zinc compounds:

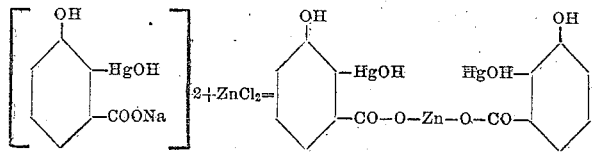

We claim:—

1. The process of preserving wood which comprises impregnating the wood with a solution of a substantially non-ionizable poisonous organic metal compound containing the metal joined directly to carbon, and converting such compound after impregnation into an insoluble condition.

2. The process of preserving wood which comprises impregnating the wood with an alkaline solution of a substantially non-ionizable poisonous organic metal compound containing the metal joined directly to carbon and converting such compound after impregnation into an insoluble condition.

3. The process of preserving wood which comprises impregnating the wood with a solution of a substantially non-ionizable poisonous organic mercury compound containing the mercury joined directly to carbon, and converting such compound after impregnation into an insoluble condition.

4. The process of preserving wood which comprises impregnating the wood with a solution of a substantially non-ionizable poisonous organic oxy-mercuric compound containing the mercury joined directly to carbon, and converting such compound after impregnation into an insoluble condition.

5. The process of preserving wood which comprises impregnating the wood with a solution of a substantially non-ionizable poisonous aromatic metal compound containing the metal joined directly to carbon, and converting such compound after impregnation into an insoluble condition.

6. The process of preserving wood which comprises impregnating the wood with a solution of a substantially non-ionizable poisonous oxy-substituted aromatic organic metal compound containing the metal joined directly to carbon, and converting such compound after impregnation into an insoluble condition.

7. The process of preserving wood which comprises impregnating the wood with a solution of a poisonous organic metal compound, and converting such compound after impregnation into an insoluble condition, by treatment with a solution of a metal salt.

8. The process of preserving wood which comprises impregnating the wood with a solution of a poisonous organic mercury compound, and converting such compound after impregnation into an insoluble condition by treatment with a solution of a metal salt.

9. The process of preserving wood which comprises impregnating the wood with a solution of a poisonous aromatic organic metal compound, and converting such compound after impregnation into an insoluble condition by treatment with a solution of a metal salt.

10. The process of preserving wood which comprises impregnating the wood with a solution of a poisonous oxy-substituted aromatic organic metal compound, and converting such compound after impregnation into an insoluble condition by treatment with a solution of a metal salt.

11. As a new product, wood impregnated with an insoluble and substantially non-ionizable poisonous organic metal compound in which the metal is joined directly to carbon.

12. As a new product, wood impregnated with a substantially non-ionizable poisonous organic metal compound in which the metal is joined directly to carbon.

13. As a new product, wood impregnated with an insoluble and substantially non-ionizable poisonous organic mercury compound in which the mercury is joined directly to carbon.

14. As a new product, wood impregnated with an insoluble and substantially non-ionizable poisonous organic oxy-mercuric compound in which the mercury is joined directly to carbon.

15. As a new product, wood impregnated with an insoluble and substantially non-ionizable poisonous aromatic organic metal compound in which the metal is joined directly to the aromatic nucleus.

16. As a new product, wood impregnated with a substantially non-ionizable poisonous aromatic organic metal compound in which the metal is joined directly to the aromatic nucleus.

17. As a new product, wood impregnated with an insoluble and substantially non-ionizable poisonous oxy-substituted aromatic organic metal compound in which the metal is joined directly to the aromatic nucleus.

18. As a new product, wood impregnated with an insoluble and substantially non-ionizable salt of a poisonous organic metal compound in which the metal is joined directly to carbon.

19. As a new product, wood impregnated with an insoluble and substantially non-ionizable salt of a poisonous organic mercury compound in which the mercury is joined directly to carbon.

20. As a new product, wood impregnated with an insoluble and substantially non-ionizable salt of a poisonous oxy-substituted aromatic organic metal compound in which the metal is joined directly to the aromatic nucleus.

21. As a new product, wood impregnated with an insoluble and substantially non-ionizable, poisonous, aromatic mercuric compound in which the mercury is joined directly to the aromatic nucleus.

22. As a new product, wood impregnated with an insoluble and substantially non-ionizable, poisonous, aromatic, oxymercuric compound in which the mercury is joined directly to the aromatic nucleus.

In testimony whereof we have hereunto set our hands in the presence of two subscribing witnesses.

WALTER SCHOELLER.
WALTHER SCHRAUTH.

Witnesses:
HENRY HASPER,
WOLDEMAR HAUPT.